June 8, 1937.  G. E. WEIST  2,083,413
WEIGHING SCALE
Filed July 1, 1933   2 Sheets-Sheet 1

INVENTOR.
Glenn E. Weist
BY
ATTORNEY

June 8, 1937.  G. E. WEIST  2,083,413
WEIGHING SCALE
Filed July 1, 1933  2 Sheets-Sheet 2

INVENTOR.
Glenn E. Weist
BY
ATTORNEY

Patented June 8, 1937

2,083,413

UNITED STATES PATENT OFFICE 2,083,413

WEIGHING SCALE

Glenn E. Weist, Bridgeport, Conn., assignor to The Kron Co., Bridgeport, Conn., a corporation of Connecticut Application July 1, 1933, Serial No. 678,576

1 Claim. (Cl. 265—61)

This invention relates to improvements in the mechanism of weighing scales and parts thereof.

In scales for measuring weight by means of a gravity balance and utilizing a pointed designed to sweep around a circle of graduations and whose operating range includes the larger part of such circle, problems arise in the provision of practical mechanism which will positively and with maximum precision produce minute increments of movement of a pendulum arm in accurate proportion and immediately responsive to slight variations in the load being weighed. Also it is a problem to make use of mechanism that is practically rugged and properly constrained against jars and outside disturbance to transmit these minute pendulum movements in a way to produce considerably greater angular movement of the weight indicating pointer without errors entering into this multiplication of movement. The slightest sluggishness in the movement of the pendulum arm responsive to load changes as well as the slightest looseness or lack of definite constraint of the mechanical parts which transmit the pendulum movement to the weight measuring pointer will defeat the ability of the latter to perform a true indicating function with reliable promptness and precision.

The present improvements aim more thoroughly to eliminate sluggishness while at the same time providing positive free pivotal constraint both for the pendulum and for the pointer shafts to enable these parts and the mechanism which operatively connects them to perform their intended functions with more accuracy and with greater protection than has been possible in the former use of so called "knife-edge" bearings or strap suspensions or rectilinear movements. To this end, the improvements further provide a novel construction of support frame particularly designed to afford a pivotal mounting and constraint for the pendulum and pointer shafts which shall insure true rotative movement thereof about dependably fixed and invariably spaced axes.

Referring to the drawings:

Fig. 1 is a front view of a mechanism assembly embodying the present improvements and which is commonly located at the rear of the weight indicating dial of which a fragment is shown. The frame appears partly cut away to expose the construction of one of the pendulum arms whose shaft is sectioned on the plane 1—1 in Fig. 2. One of the bearing caps is also cut away to expose the bearing.

Fig. 3 is a sectional view taken on the vertical plane 3—3 in Fig. 1 showing the bearing construction for the pointer shaft.

Figure 1:
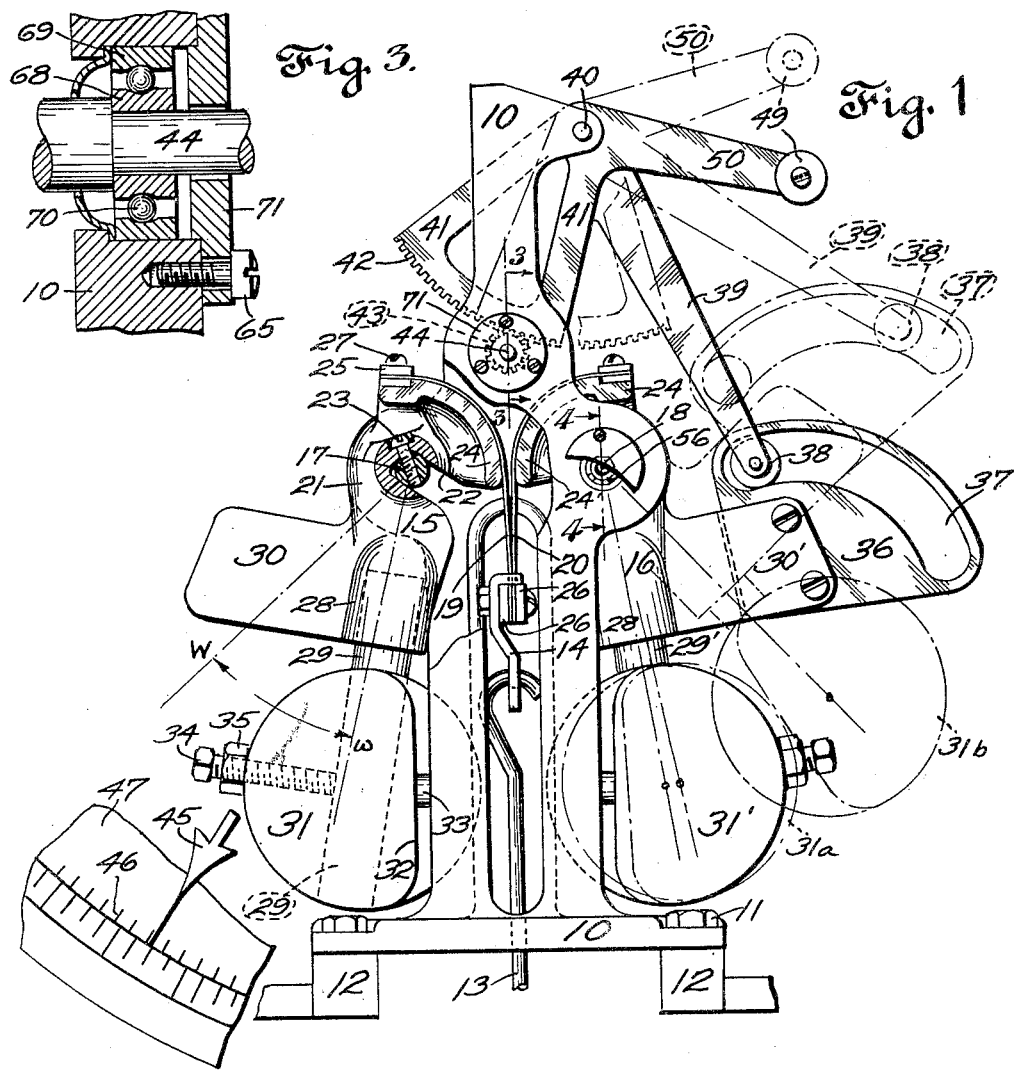
Figure 2:
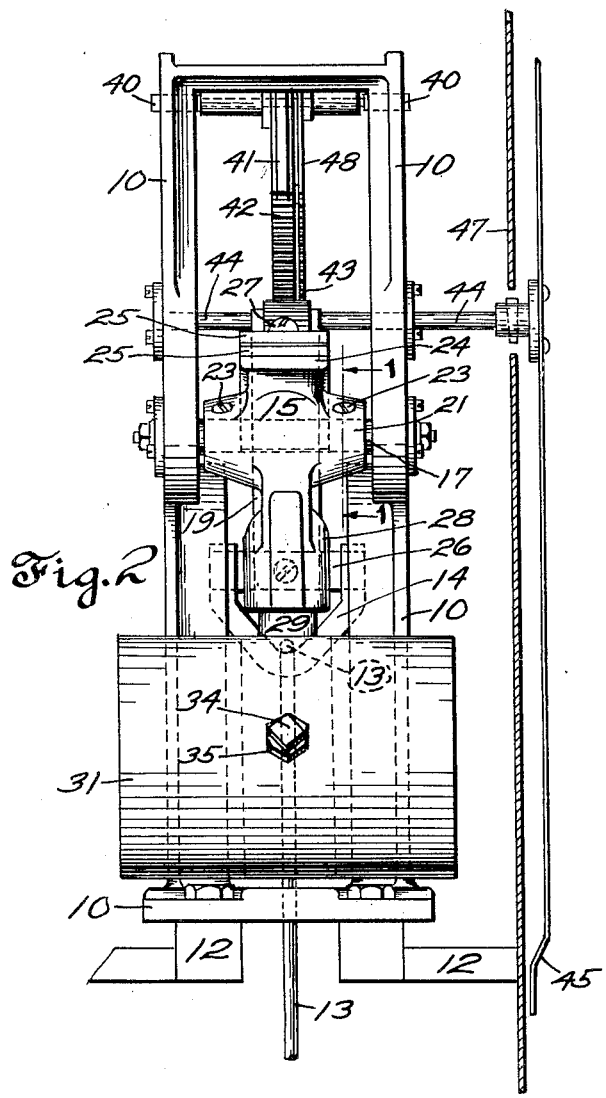
Fig. 2 is a view looking from the left at Fig. 1, parts of the indicating pointer and dial being shown, the latter in vertical section.

I shall refer to the composite mechanism shown in Figs. 1 and 2 as the dial head assembly, which assembly is composed of a skeleton cast metal frame 10 mounted by bolts 11 on the support 12 which may comprise the header for any form of scale body provided with a platform or other depressible rest for receiving the load which is to be weighed. The scale body and platform are not herein shown, it sufficing to say that the load to be weighed exerts a downward force on the draft rod 13 which is hooked at its upper end and thereby suspended from the V-shaped bracket 14.

The frame 10 for the purpose of providing positive fixity of its dimensions and invariable spacing of certain bearings carried by it to support moving parts of the mechanism, is preferably formed as an integral casting of metal providing spaced standards or uprights connected and braced by a bridge of the casting metal at the top and by a base of the casting metal at the bottom as clearly shown in Fig. 2, the uprights having solid wall portions of substantial thickness in their mid sections which flank the opposite sides of the pendulums as viewed in Fig. 2 and which also flank the dial pointer 45. Each of these wall portions contains a group of three neighboring horizontal bores and each bore is counterbored from the outer surface of the upright to provide a shouldered recess or cavity to receive a ball bearing. Two groups of three neighboring ball bearings each thus carried in the frame uprights afford rigidly supported antifrictional constraint for the two pivoted weight counter-balancing pendulums 15, 16, and for the weight indicating pointer 45 having relatively multiplied angular movement as hereinafter described.

Two similarly shaped and symmetrically disposed pendulum arms 15 and 16 act together to counter-balance the pull of the load on draft rod 13 and are mounted respectively on bearing shafts 17 and 18 affording trunnions at both sides of each pendulum and jointly act to support the suspension bracket 14 by means of the respective draft bands 19 and 20. Shafts 17 and 18 are themselves rotatively supported and radially constrained against shocks and vibration by a series of surrounding bearing balls 58, 63, etc. rolling between outer race ring 55 and inner race ring 57 as will hereinafter be described. 60 is representative of any cage device for spacing the bearing balls circumferentially in a well known manner.

It will suffice to describe the left pendulum arm 15 as composed of a hub casting 21 formed with the following portions. A cut-away 22 permits hanging of the casting 21 on the shaft 17 without removing the shaft from its frame bearing and the screw 23 engages a threaded diametrical hole in shaft 17 for securing hub 21 thereon. Concentric with the axis of shaft 17 is the circumferential seat 24 for the draft band 19, this band being made of very thin and suitably tempered steel or other non-deforming substance, at the terminals of which are die cast integral therewith, or otherwise rigidly secured thereto, the terminal bars 25—25 and 26—26. Terminal bars 25—25 are secured in a notch in the seat 24 by the screw 27 and the V-shaped load bracket 14 hooks over and is suspended from the terminal bars 26—26 between which is also secured the draft band 20 anchored to the pendulum arm 16 in all respects as has been described above with reference to the draft band 19. A radial portion 28 of hub 21 affords a socket in which is fixedly cast or otherwise secured the weight rod 29 and has the lateral fin 30.

The weight cylinder 31 partially enters between the uprights or posts of frame 10 in its central portion but is cut back at its end portions to form the straight surface 32 which without load on the draft rod 13 will abut against rubber bumpers 33 projecting from the frame 10. A diametric hole through the weight cylinder 31 permits lengthwise adjustment of the cylinder on the rod 29 and the weight is secured by its set screw 34 locked by the nut 35.

The corresponding portions of the pendulum arm 16 are indicated by similar reference characters respectively primed, and the fin 30' is seen to carry a cam 36 having the arcuate slot 37 in which may freely ride the roller 38 pivoted at the end of the sector arm 39 which itself is pivoted at 40 to the frame 10. The sector 41, integral with arm 39, carries the segmental gear teeth 42 which mesh with the pinion 43 which is fast to the shaft 44. Shaft 44 protrudes forwardly in Fig. 1 to carry the weight indicating pointer 45 in position to sweep over the graduations 46 around the dial 47 which is stationary with the frame 10 and standards 12. An auxiliary sector 48 constantly urged clockwise in Fig. 1 by the weight 49 at the end of the arm 50 acts to take up any loose play that exists between the teeth of sector 41 and the pinion 43.

In Fig. 1 the parts are at rest in their full line positions. The weight of the platform and other load handling parts, not shown, may be such as to swing the weight cylinder 31' to its position 31a in Fig. 1 for which position of the weight 31 the pointer 45 may be adjusted to register with its zero graduation on the scale of graduations 46. I may design the maximum lift of the pendulum arm 15 to be the position of its parts represented by broken lines in Fig. 1 corresponding to position 31b of the weight cylinder.

Here it is seen that the cam 36 has swung the sector 41 counter-clockwise resulting in nearly a full turn of the pointer 45 around the dial, and varying the curvature and disposition of the arcuate slot 37 in cam 36 will, of course, vary the performance of the pointer 45 corresponding to movements of the pendulum arm 16 so that the pointer action can be made whatever is desired.

In the above described mechanism of the dial head assembly there are points required to be peculiarly sensitive to forces acting thereon and the provision of practically rugged construction which will permit of the desired sensitiveness has heretofore proven a problem in the practical construction and use of this type of weighing scale. The pendulum arms, for instance, must successfully support the heavy loads represented by the combined weight of both the pendulum arms plus the pull of draft rod 13 in a way to afford the greatest possible freedom of swinging movement to each pendulum arm while thus heavily loaded. The pointer shaft 44 must be pivotally supported in nearly as possible a frictionless manner but at the same time maintained at an extremely accurate center distance from the pivot 40 of the sector arm 39. These problems differ in that the pendulum arms perform small angular movements under heavy loads while the pointer shaft 44 performs greatly multiplied degrees of angular movement under very light load.

Problems of the above kind are foreign to the purposes for which ball or roller bearings have been developed in continuously rotating machines and the absence of use of such bearings at fulcrum points in weighing scales as commonly constructed bears witness to the problems attending the attempted use of such bearings. The present improvements are therefore regarded as novel in the successful provision of rolling ball support for pendulums of scales irrespective of the particular arrangement of the balls or rollers. The particular modifications of ball-bearing design herein disclosed also comprise advantageous improvements over more conventional constructions for the purposes concerned.

I prefer to eliminate as much as possible the slight frictional effects which are inherent in ball-bearings as commonly constructed for rotary machines and journals whereby the tendency to sluggishness in the swinging action of the pendulum arms 15 and 16 to their precise angle of balance is reduced thus better enabling this angle of balance to vary sensitively with every minute change of load force applied to the draft rod 13.

Figure 4:
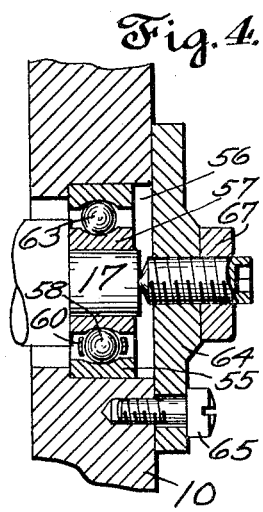
Fig. 4 is a sectional view on a scale corresponding to Fig. 5 taken through the pendulum arm bearing on the plane 4—4 in Fig. 1.

Fig. 4 indicates a frictionless thrust support against the ends of shaft 17 and shaft 18, it being understood that whatever form of bearing is used at one end of these shafts may be duplicated at the other end. The closure cap 64 is secured to the sides of the frame 10 by the screws 65 and contains centrally thereof the adjustable thrust screw 66 cone pointed for frictionless contact with the end of shaft 17 and held in designed adjustment by a lock nut 67. I am thus enabled to relieve the bearing balls from any endwise thrust duty whereby if desired the curvature of the grooves in the ball races may be formed to less nearly accord with the curvature of the ball itself, it being found that this is an expedient which reduces friction in the action of the balls to which it would not be practical to resort if the balls themselves were relied upon to take an end thrust of the shaft 17.

By seating each of the ball bearing outer races 55 and 69 in a recess or counter bore at the outer end of the smaller size bore through which shafts 17, 18, and 44 extend to reach the ball bearings, it becomes possible to insert and remove through the outer surface of the frame uprights any ball bearings at will and without disturbing the assembled relationship of any of the rest of the mechanism. When a ball bearing is so removed its shaft will remain conveniently supported in the smaller bore through which it extends to engage the ball bearing and in a position enabling the latter easily to be restored or replaced when assembling or servicing the scale.

Fig. 3 shows a possible construction for the bearing in each frame post for the pointer shaft 44 and at this point it has been found advantageous and possible to make use of a more conventional type of ball bearing which is represented as composed of an inner race 68 fast to the shaft 44 and an outer race 69 held in the frame 10 accommodating therebetween the balls 70 which need not in further detail be described. A closure cap 71 may be held against the frame 10 by screws 65 as in the case of the bearing cap 64.

I may attain some of the aims and advantages of these improvements while supporting the pendulum arms on more conventional arrangements of ball-bearings or roller-bearings. Also I may provide tracks for the balls or rollers of other than circular cross-sectional shape and I may arrange the pendulum arms to be rigid with the outer ball race 55 instead of with the inner ball race or collar 57, in which case the working position of those balls supporting the weight would be at the top of the circular race-way instead of at the bottom.

The present improvements may have application to any tilting or swingable member such as ordinary weigh beams used in weighing machines or the like and I therefore intend the language of the following claims to include the fair equivalents of all means mentioned herein and to include substitutes for and departures from the exact arrangements disclosed herein which would be suggested by the disclosure.

I claim:

In dial head mechanism for weighing scales, in combination, a weighing pendulum, rigid frame walls flanking respectively opposite sides of said pendulum and containing mutually aligned apertures enlarged in compass in their portions opening through the outwardly disposed sides of each of the frame walls thereby to form a frame shoulder within each aperture, a shaft carrying said pendulum and penetrating said apertures and having end portions occupying the enlarged portions of said apertures, an outer race ring internally grooved to form a ball track and seated within each of the enlarged portions of said apertures, an inner race ring externally grooved to form a ball track and removably mounted on each end portion of said shaft, bearing balls of materially smaller spherical surface curvature than is the crosswise curvature of said tracks and disposed to roll therebetween for supporting and constraining said shaft in radial directions without opposing axial movements thereof, and axially adjustable thrust abutments supported by said frame walls in a manner to be removable therefrom without disturbing said race rings and positioned to contact respectively with the ends of said shaft thereby to relieve said bearing balls from taking the end thrust of said shaft.

GLENN E. WEIST.